United States Patent [19]

Hopkins

[11] 4,428,922

[45] Jan. 31, 1984

[54] PROCESS FOR MANUFACTURING HYDROGEN PEROXIDE

[75] Inventor: Quentin G. Hopkins, Charleston, W. Va.

[73] Assignee: FMC Corporation, Philadelphia, Pa.

[21] Appl. No.: 378,146

[22] Filed: May 14, 1982

[51] Int. Cl.$^3$ .............................................. C01B 15/02
[52] U.S. Cl. .................................................. 423/588
[58] Field of Search ........................ 423/588, 589, 590

[56] References Cited

U.S. PATENT DOCUMENTS

| | | | |
|---|---|---|---|
| 2,158,525 | 5/1939 | Riedl et al. | 23/207 |
| 2,215,883 | 9/1940 | Riedl et al. | 23/207 |
| 2,837,411 | 6/1958 | Jenny | 23/207 |
| 3,009,782 | 11/1961 | Porter | 23/207 |
| 3,565,581 | 2/1971 | Lee | 423/589 |
| 3,615,207 | 10/1971 | Lee | 23/207 |
| 3,755,552 | 8/1973 | Lee et al. | 423/588 |

FOREIGN PATENT DOCUMENTS 35-4121  4/1960  Japan .

OTHER PUBLICATIONS

Shah, Y. T., *Gas-Liquid-Solid Reactor Design*, McGraw-Hill, New York (1979) pp. 180–184.
Perry, R. H. & Chilton, C. H., *Chemical Engineers Handbook*, Fifth Edition, McGraw-Hill, New York (1973) pp. 19-22-24.
Sato, Y. et al, "Flow Pattern and Pulsation Properties of Cocurrent Gas-Liquid Downflow in Packed Beds", *Journal of Chemical Engineering of Japan*, 6, (1973) pp. 315–319.
Perry, *Chemical Engineers' Handbook*, Third Edition (1950), McGraw-Hill Book Co., Inc., pp. 1214–1217.

*Primary Examiner*—O. R. Vertiz
*Assistant Examiner*—Wayne A. Langel
*Attorney, Agent, or Firm*—Richard E. Elden; Eugene G. Horsky; Eugene G. Seems

[57] ABSTRACT

In the anthraquinone process for manufacturing hydrogen peroxide an improvement is obtained in the productivity of a fixed-bed catalytic hydrogenator operating in the dispersed-bubble flow regime by premixing the hydrogen gas and the working solution by means of a static mixer.

1 Claim, No Drawings

PROCESS FOR MANUFACTURING HYDROGEN PEROXIDE

This invention relates to the production of hydrogen peroxide by the anthraquinone process.

It is well-known that anthraquinone compounds, such as 2-ethylanthraquinone, amylanthraquinone, and their tetrahydro derivatives can be used as working compounds in a cyclical process for producing hydrogen peroxide. In this process, commonly known as the anthraquinone process, a working compound is dissolved in a solvent, or a mixture of solvents, to form a working solution. During the hydrogenation step, the working compound is reduced in the presence of a catalyst to its "hydroquinone" form. In the subsequent oxidation step, the hydrogenated working compound is oxidized with air, oxygen, or some other oxygen-containing gas to convert it to its "quinone" form with the simultaneous formation of hydrogen peroxide. The hydrogen peroxide product is then removed from the working solution, usually by extraction with water, and the remaining working solution is recycled to the hydrogenator to again commence the process. This process is well-known and is described fully in U.S. Pat. No. 2,158,525 and in U.S. Pat. No. 2,215,883.

The hydrogenation steps may be in the presence of a fixed-bed catalyst or a fluid-bed catalyst. Either method is known to have its particular advantages and disadvantages. In a fluid-bed hydrogenator, the rates of reaction are generally high and quinone losses are minimal; however, the catalyst particles are rapidly broken down by abrasion and the hydrogenator is subject to back-mixing which frequently requires the use of a larger hydrogenator and expensive filtration equipment to obtain a fully-hydrogenated product. On the other hand, the fixed-bed hydrogenator does not abrade the catalyst and if operated in a cocurrent flow does not result in back-mixing. It is presently believed that the reaction rate of a fixed-bed hydrogenator is limited by the relatively slow rate of solution of hydrogen from the gas phase into the working solution. In U.S. Pat. No. 2,837,411, Jenney discloses recycling of sufficient working solution to dissolve the required quantity of hydrogen necessary to thoroughly reduce all of the working compound. However, because of the low solubility of hydrogen in the solvents used, a very large recycle stream and a correspondingly large hydrogenator is required; thus adding to the capital costs of the process. In addition, the recycling of the hydrogenated solution results in over hydrogenation of the working compounds so that they are ineffective in the overall process.

In Japanese Pat. No. 60-4121, it was disclosed that the hydrogen and working solution could be combined to form a foam to eliminate the possibility of channeling in a fixed-bed hydrogenator operating in the trickle-flow regime. The great excess of hydrogen used has the advantage of creating resistance to the gas-liquid flow and helps the distribution of the solution across the catalyst bed, thus preventing channeling. However, this back pressure also increases the energy consumption of the process and requires a large recycle stream of hydrogen back through the hydrogenator. In addition, the through-put or productivity of the hydrogenator is drastically reduced because of the large volume occupied by the excess hydrogen gas.

Porter, in U.S. Pat. No. 3,009,782, discloses another solution to the low reaction rate problem. The high velocity of the liquid working solution is maintained through the hydrogenator, together with relatively low hydrogen gas flows, so that bubbles of hydrogen are entrained in the flow and thoroughly mixed to increase the mass transfer from the gas phase into the solution. Porter maintains the necessary flow rates by recycling some reduced solution through the hydrogenator to maintain the continuous liquid phase with bubbles dispersed therein. This dispersed-bubble flow regime has been found to be superior to the trickle-flow regime because of the higher interaction between the gas and liquid phase. The dispersed-bubble flow regime is characterized by a continuous phase of luquid with bubbles dispersed therein. This condition occurs with relatively high, liquid-flow rates and relatively low, gas-flow rates. The transition zones between the trickle-flow regime, the pulse-flow regime, and the dispersed-bubble flow regime depend not only upon the gas and liquid flow rates, but the nature and size of the packing and the nature and properties of the liquid. Although the exact transition zone must be determined by experiment, it can be characterized approximately in terms of the relative flow rates. One convenient characterization is that of Shah, Y. T., Gas-Liquid-Solid Reactor Design. New York: McGraw-Hill (1979), pages 180–184.

It is now been found that the productivity or efficiency of a hydrogenator operating in the dispersed-bubble flow regime can be improved if the hydrogen gas is dispersed within the working solution prior to contacting the hydrogenation catalyst. Preferably, this dispersion can be effected using a static mixer. One advantage is that there are no seals required for such a mixer which could fail and permit the escape of hydrogen into the atmosphere.

As the prior art indicated that there is a significant interaction between the liquid and gas in the dispersed-bubble flow regime, it was unexpected to find that dispersing the hydrogen gas within the liquid would improve the productivity of a hydrogenator. The reason for this improved productivity is not understood at this time; under ordinary dispersed-bubble operations the recycled portion of the working solution is already saturated with hydrogen so that mere saturation alone does not explain this effect. In addition, the high degree of interaction between liquid and gas in a dispersed-bubble flow regime hydrogenator is such that premixing of the hydrogen with the fluid should have little or no effect.

In carrying out the present invention a working solution containing an anthraquinone working compound is dissolved in a suitable organic solvent. The working compound must be capable of being alternately reduced and oxidized to produce hydrogen peroxide. Working compounds that can be used in the present process are those that contain anthraquinone or the 2-isopropyl-, 2-sec-butyl-, 2,5-butyl-, 2-sec-amyl, 2-methyl- or 1,3-dimethyl derivatives of anthraquinone, as well as other anthraquinones well-known in the hydrogen peroxide art. These working compounds are dissolved in at least one organic solvent to form the anthraquinone working solution; two or more mixed organic solvents may be used to enhance the solubility of an anthraquinone working compound in both its hydrogenated form, that is, the "hydroquinone" form, and its oxidized form, that is, the "quinone" form.

In accordance with the present process, the hydrogen gas is dispersed in the form of small, uniform bubbles in the working solution prior to contacting the hydrogenation catalyst which is supported within the hydrogenator as a fixed bed. This dispersion may be accomplished by any known means, but preferably is accomplished by means of a static mixer, such as described by Perry, R. H., and Chilton, C. H., *Chemical Engineer's Handbook*, Fifth Edition. New York: McGraw-Hill (1973) Section 19, page 22. The static mixer may be installed either in a line before the hydrogenator or as part of the hydrogenator itself.

The quantities of hydrogen gas and working solution fed to the hydrogenator are important but not critical as long as the flow in the hydrogenator is maintained in the dispersed-bubble flow regime. Economics demand that sufficient hydrogen must be available in order to ensure that the working solution emerging from the hydrogenator is close to saturation so that the catalyst in the lowest section of the hydrogenator is utilized. A slight excess of hydrogen gas is preferred to ensure that sufficient hydrogen is present to accommodate surges in the flow of the working solution. The use of a substantial excess of hydrogen, greater than 10 percent of the theoretical hydrogen, does not provide any advantage in hydrogenation and has the disadvantage of adding to the raw material costs and making it more difficult in maintaining the flow of the hydrogenator in the dispersed-bubble flow regime.

The flow of the working solution through the hydrogenator must be great enough to maintain the necessary continuous liquid phase in the hydrogenator; it may be necessary to recycle some of the hydrogenator effluent to provide a sufficient flow, particularly in a commercial plant operating at less than the maximum operating rate. It is obvious that minimizing the recycle will reduce the operating costs at the designed hydrogenator capacity.

EXAMPLE

An anthraquinone working solution was made up by mixing 75% by volume of a commercially available, mixed aromatic solvent with 25% by volume of tris(2-ethylhexyl) phosphate. Thereafter, 10% by weight of 2-ethylanthraquinone was dissolved in the mixed solvent. The mixed aromatic solvent contained about 99.6% aromatics, having a boiling point range of 182° C. to 204° C., obtained from the Shell Chemical Company and identified as Cyclosol 63; it had an aromatic content of about 82.3% $C_8$ to $C_{12}$ alkyl benzene, 80% of which was $C_{10}$ to $C_{11}$ alkyl benzene, and 13.3% cycloalkyl benzene, 3.5% $C_{10}$ diaromatic (naphthalene).

A 17 centimeter diameter fixed-bed catalytic hydrogenator (holding 20 kilograms of palladium catalyst) was operated as described in U.S. Pat. No. 3,615,207. The hydrogenator was piped so that the working solution and hydrogen could be fed into the top of the hydrogenator directly, or premixed using a 2.5 centimeter diameter type DY Koch static mixer. The temperature in the catalyst bed was maintained between 50° C. and 60° C. The hydrogenated working solution recovered from the base of the hydrogenator was pumped into an oxidizing vessel where it was oxidized by passing air through the working solution until oxidation of the solution was complete. The temperature of the solution in the oxidizer was maintained at from 50° C. to 60° C. The oxidized working solution was continuously removed from the oxidizer and passed into an extraction unit wherein the hydrogen peroxide formed was extracted with water from the working solution.

The raffinate and water extract were then permitted to separate into an organic phase and a water phase; the water phase, containing most of the hydrogen peroxide, was separated from the organic phase. The remaining organic phase, which was made up essentially of the working solution, was recycled to the hydrogenator to again commence the cycle for producing hydrogen peroxide.

The productivity of the hydrogenator was determined by calculating the 2-ethylhydroquinones produced as the equivalent weight of hydrogen peroxide produced per hour using the unit of grams of hydrogen peroxide per kilogram of catalyst (g $H_2O_2$/kg catalyst).

The pilot hydrogenator was operated continuously under substantially uniform conditions until the productivity of the catalyst indicated that a relatively steady productivity rate had been reached.

At that time, a series of sixteen 24-hour runs were made in duplicate in which the flow rates through the catalyst beds were maintained at 8.4 and 10.4 kilograms of working solution per hour per square centimeter (kg working solution/[hr $cm^2$]) and hydrogen pressures were maintained at 365 kPa to 486 kPa, both with and without premixing the hydrogen and working solution. The averages of each pair of the duplicate runs appear in Table I.

These flow rates are well within the dispersed-bubble flow regime as published. A map of the flow regimes based on visual observation confirmed that all the runs were within the dispersed-bubble flow regime.

TABLE I

Effect of Flow Rates and Premixing on Productivity

| Run | Gas Pressure kPa | Flow Rate Gas g/(hr $cm^2$) | Flow Rate Liquid kg/(hr $cm^2$) | Pre-mixer | Hourly Productivity g $H_2O_2$/kg Catalyst |
|---|---|---|---|---|---|
| 1 | 365 | 3.3 | 8.4 | Off | 230 |
| 2 | 486 | 4.2 | 8.4 | Off | 290 |
| 3 | 365 | 4.6 | 10.4 | Off | 320 |
| 4 | 486 | 4.6 | 10.4 | Off | 320 |
| 5 | 365 | 3.6 | 8.4 | On | 300 |
| 6 | 486 | 3.5 | 8.4 | On | 290 |
| 7 | 365 | 4.3 | 10.4 | On | 360 |
| 8 | 486 | 4.8 | 10.4 | On | 400 |

What is claimed is:

1. An improved process for producing hydrogen peroxide by the alternate reduction and oxidation of an alkylated anthraquinone as the working material dissolved in a solvent to constitute a liquid working solution which is reduced with hydrogen gas while flowing through a hydrogenation catalyst supported as a fixed bed at a sufficient rate to entrain the hydrogen gas as bubbles in a continuous liquid phase of working solution wherein the improvement comprises dispersing the hydrogen gas in the working solution with a static mixer prior to contacting the hydrogenation catalyst.

* * * * *